US008190120B1

(12) United States Patent
Rieschick et al.

(10) Patent No.: US 8,190,120 B1
(45) Date of Patent: May 29, 2012

(54) METHOD AND SYSTEM FOR THE CREATION OF LOCATION BASED RECORDS

(75) Inventors: Gary Joel Rieschick, Louisburg, KS (US); Kent DeLancy Mabee, Leawood, KS (US); Troy Alexander Wilson, Lenexa, KS (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 960 days.

(21) Appl. No.: 12/109,562

(22) Filed: Apr. 25, 2008

(51) Int. Cl.
*H04M 11/00* (2006.01)
(52) U.S. Cl. ..................................... 455/405; 370/339
(58) Field of Classification Search .............. 455/405
See application file for complete search history.

(56) References Cited

U.S. PATENT DOCUMENTS

| 3,935,549 A | 1/1976 | Jachowski |
| 4,206,464 A | 6/1980 | Hirsch |
| 5,923,647 A | 7/1999 | Dolman et al. |
| 6,466,773 B1 | 10/2002 | Johnson |
| 2005/0277420 A1* | 12/2005 | Shin et al. ..................... 455/442 |
| 2007/0072605 A1* | 3/2007 | Poczo ........................ 455/432.2 |
| 2008/0119160 A1* | 5/2008 | Andriantsiferana et al. . 455/406 |

OTHER PUBLICATIONS

Emailwire.com, "Lightship Telecom Boosts Mediation and Network Management Capabilities with Suite of Products from Equinox Information Systems," Jul. 23, 2001, 3 pages, emailwire.com, Nashville, Tennessee, http://www.emailwire.com/release/Lightship-Telecom-Boosts-Mediation-and-Network-Management-Capabilities-with-Suite-of-Products-from-Equinox-Information-Systems.html.

* cited by examiner

*Primary Examiner* — Dwayne Bost
*Assistant Examiner* — Joseph Dean, Jr.

(57) ABSTRACT

A method for providing location information for a wireless device in a communication system is provided. The method comprises receiving a usage data record for the wireless device at an access node, and providing the usage data record to an authentication node. The method further comprises creating a location record from the usage data record when the authentication node determines that the communication system does not require the usage data record, populating the location record with one or more location attributes associated with the wireless device, and providing the location record to the authentication node.

25 Claims, 6 Drawing Sheets

METHOD AND SYSTEM FOR THE CREATION OF LOCATION BASED RECORDS

TECHNICAL BACKGROUND

In some modern communication systems, when a wireless device submits a request to access communications carrier networks, the request is sent to an accounting system, such as an Authentication, Authorization, and Accounting (AAA) system, where accounting records, primarily used for billing and reporting, are created. The AAA system may also process the accounting records for use by other elements in the communication system. Often, a wireless device will be associated with a usage data record that is periodically updated as the wireless device changes location or functions. This usage data record is designed to hold a large amount of diverse data and consequently may be a large data file.

Since wireless devices often have the ability to change location during operation, updated location information may be required by various elements of the communication system. As the wireless device changes location, additional usage data records containing the updated location information are provided to the AAA system. These updated usage data records may vary from the initial usage data record only in fields related to the location of the wireless device, while data in all of the other fields remain unchanged.

OVERVIEW

In an embodiment, a method for providing location information for a wireless device in a communication system is provided. The method comprises receiving a usage data record for the wireless device at an access node, and providing the usage data record to an authentication node. The method further comprises creating a location record from the usage data record when the authentication node determines that the communication system does not require the usage data record, populating the location record with one or more location attributes associated with the wireless device, and providing the location record to the authentication node.

In another embodiment, a computer system is configured to provide location information for a wireless device in a communication system. The computer system comprises a storage system containing software, a communication interface configured to receive a usage data record for the wireless device, and a processing system coupled to the communication interface and the storage system. The processing system is instructed by the software to receive a usage data record for the wireless device at an access node through the communication interface, and to provide the usage data record to an authentication node. The processing system is further instructed by the software to create a location record from the usage data record when the authentication node determines that the communication system does not require the usage data record, populate the location record with one or more location attributes associated with the wireless device, and provide the location record to the authentication node.

In a further embodiment a method for providing location information for a wireless device in a communication system is provided. The method comprises receiving a usage data record for the wireless device at an access node, and providing the usage data record to an authentication node. The method also comprises creating a location record from the usage data record when the authentication node determines that the communication system does not require the usage data record, populating the location record with one or more location attributes associated with the wireless device, and providing the location record to the authentication node. The method further comprises updating the location attributes in the location record at the access node when the wireless device changes location, and providing the updated record location to the authentication node.

DETAILED DESCRIPTION

Figure 1:
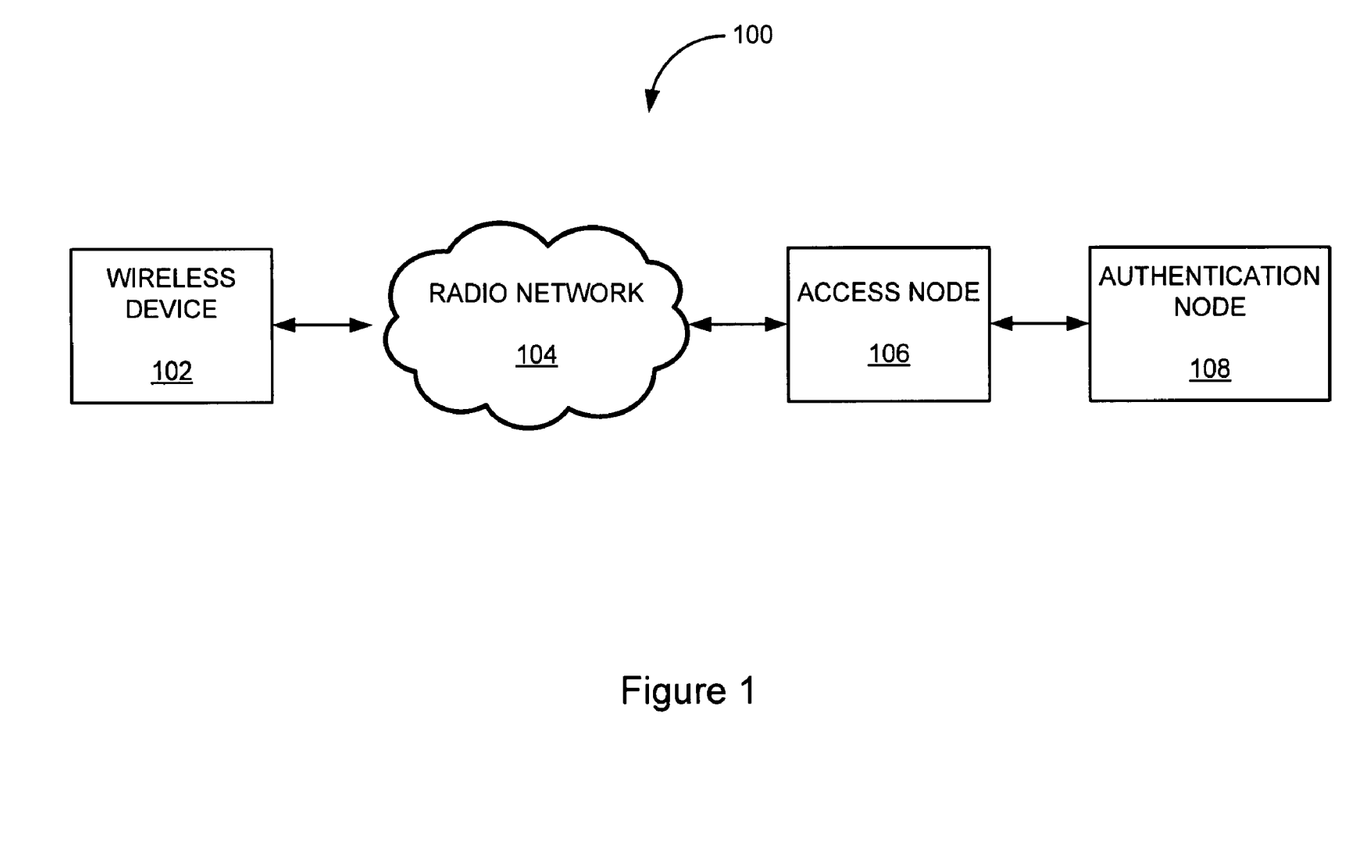
FIG. 1 is a block diagram illustrating a communication system including a computer system configured to provide location information for a wireless device.

FIG. 1 is a block diagram illustrating a communication system including a computer system configured to provide location information for a wireless device. In this embodiment, communication system 100 comprises wireless device 102, radio network 104, access node 106, and authentication node 108. Wireless device 102 is communicatively coupled with access node 106 through radio network 104. Access node 106 is communicatively coupled with authentication node 108.

Wireless device 102 may be any type of wireless communication device, such as a cellular phone, portable computer, or other such device. Radio network 104 may be any type of radio communication network, such as a cellular network, wireless internet protocol (IP) network, or the like. Access node 106 may be any device configured to provide access to radio network 104 such as an access gateway, packet data serving node (PDSN), access service node (ASN), or other such device. Authentication node 108 may be any type of authentication system, such as an authentication, authorization, and accounting (AAA) system, or the like.

In an example embodiment, access node 106 receives a usage data record for wireless device 102. This usage data record may be a relatively large file containing a wide variety of information regarding wireless device 102. Access node 106 provides this usage data record to authentication node 108 where it may be determined that communication system 100 does not require the entire usage data record. In that case, access node 106 creates a location record from the usage data record. This location record is populated with one or more location attributes associated with the wireless device. In other examples, the location record may be created or populated in authentication node 108, or other elements of communication system 100, instead of in access node 106. Access node 106 then provides the location record to authentication node 108. In some examples, access node 106 may provide the location record to additional network elements in communication system 100.

In some examples, access node 106 may create the location record by taking a subset of the data fields from the usage data record, and storing the contents of these fields as the location record. When wireless device 102 changes location, new location data may be provided to access node 106, which in turn updates the location record, and provides the updated location record to authentication node 108.

Figure 2:
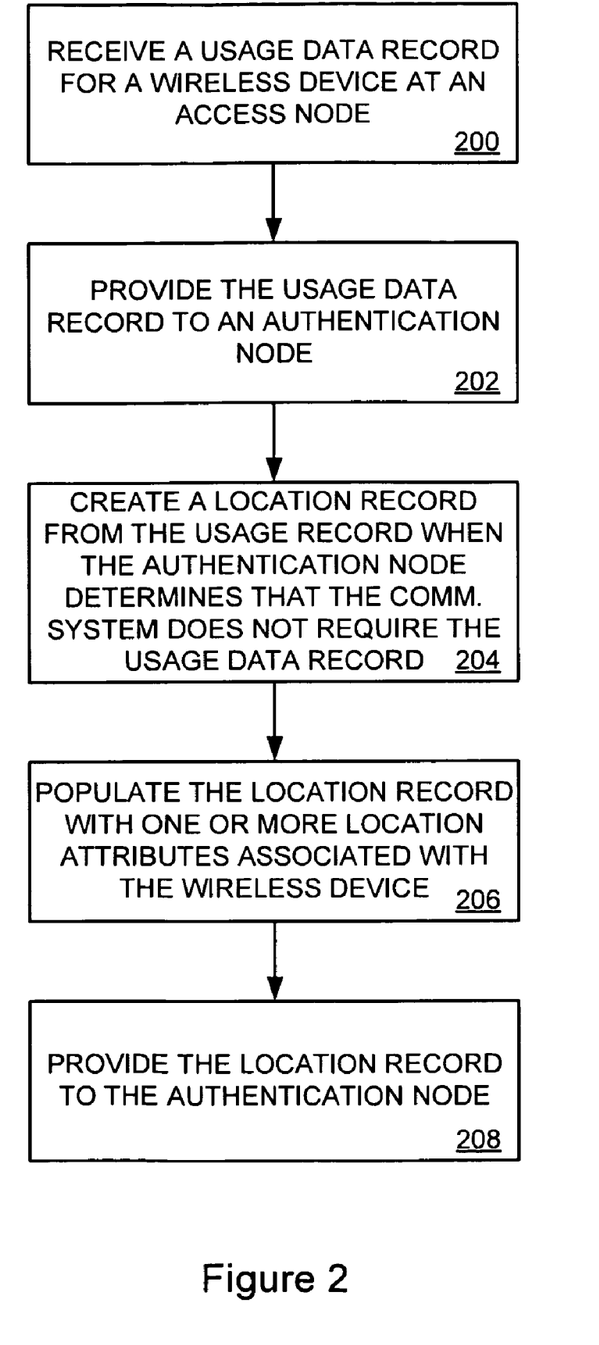
FIG. 2 is a flow diagram illustrating a method for providing location information for a wireless device in a communication system.

FIG. 2 is a flow diagram illustrating a method for providing location information for a wireless device in a communication system. Reference numerals for FIG. 2 are indicated parenthetically below. Access node 106 receives a usage data record for wireless device 102, (operation 200). Access node 106 provides the usage data record to authentication node 108, (operation 202). If authentication node 108 determines that communication system 100 does not require the usage data record, access node 106 creates a location record from the usage data record, (operation 204). Access node 108 then populates the location record with one or more location attributes associated with wireless device 102, (operation 206). Finally, access node 106 provides the location record to authentication node 108, (operation 208). In some examples, these operations may be performed by elements of communication system 100 other than access node 106 and authentication node 108.

Figure 3:
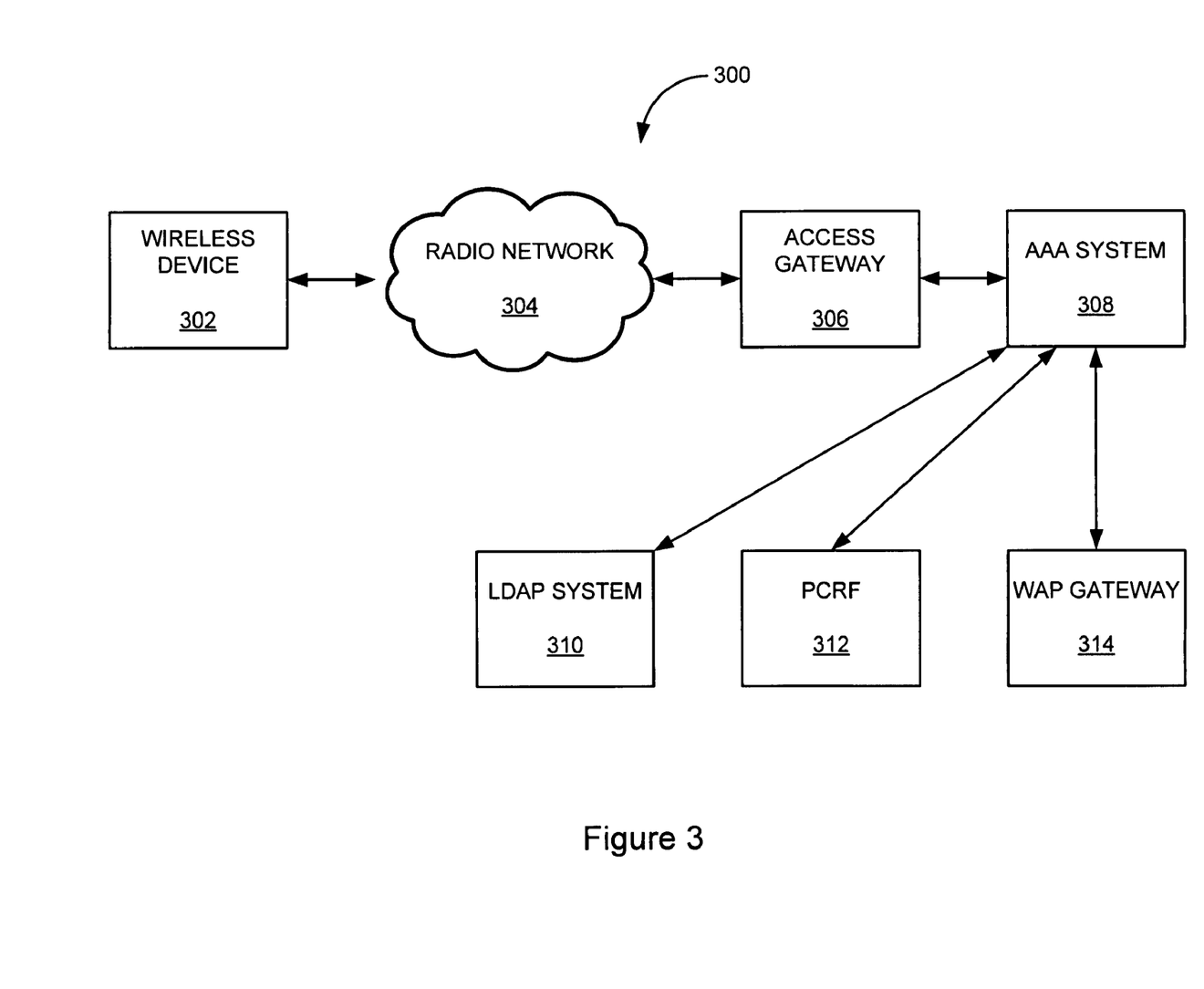
FIG. 3 is a block diagram illustrating a communication system including a computer system configured to provide location information for a wireless device.

FIG. 3 is a block diagram illustrating a communication system including a computer system configured to provide location information for a wireless device. In this embodiment, communication system 300 comprises wireless device 302, radio network 304, access gateway 306, Authentication, Authorization, and Accounting (AAA) system 308, Lightweight Directory Access Protocol (LDAP) system 310, Policy Changing and Rules Function (PCRF) server 312, and Wireless Application Protocol (WAP) gateway 314. Wireless device 302 is communicatively coupled with access gateway 306 through radio network 304. Access gateway 306 is communicatively coupled with AAA system 308. AAA system 308 is communicatively coupled with LDAP system 310, PCRF server 312, and WAP gateway 314.

Wireless device 302 may be any type of wireless communication device, such as a cellular phone, portable computer, or other such device. Radio network 304 may be any type of radio communication network, such as a cellular network, wireless internet protocol (IP) network, or the equivalent. AAA system 308 provides user data such as logon records, billing, plan details, and quota information to communication system 300 so that a user of wireless device 302 may be identified, and their access to communication system 300 controlled within the bounds of their user agreement. LDAP system 310 contains user data such as plan type, and is used to verify that the user of wireless device 302 is allowed to access communication system 300. PCRF server 312 is a policy server performing a policy determination function for communication system 300 and is configured to provide location information related to wireless device 302 to any other application within communication system 300 that needs the location information. WAP gateway 314 provides connection to the internet from a wireless device such as a mobile phone or a personal digital assistant (PDA).

In an example embodiment, access gateway 306 receives a usage data record for wireless device 302. This usage data record may be a relatively large file containing a wide variety of information regarding wireless device 302. Access gateway 306 provides this usage data record to AAA server 308 where it may be determined that communication system 300 does not require the entire usage data record. In that case, access gateway 306 creates a location record from the usage data record. This location record is populated with one or more location attributes associated with wireless device 302. In other examples, the location record may be created or populated in AAA server 308, or in other elements of communication system 300, instead of in access gateway 306. Access gateway 306 then provides the location record to AAA server 308. In some examples, AAA system 306 may provide the location record to additional network elements in communication system 300, such as LDAP system 310, PCRF system 312, and WAP gateway 314.

In some examples, access gateway 306 may create the location record by taking a subset of the data fields from the usage data record, and storing the contents of these fields as the location record. When wireless device 302 changes location, new location data may be provided to access gateway 306, which in turn updates the location record, and provides the updated location record to AAA system 308 and other elements of communication system 300 as necessary.

In some examples, the location record may comprise a subset of the fields present in the usage data record. For example, the location record may comprise fields for the MIP (Mobile Internet Protocol) Home Agent (HA) (containing the IPv4 (Internet Protocol version 4) address of the Home Agent), the PDSN (Packet Data Serving Node) Address (containing the IPv4 address of the PDSN), the Serving PCF (Packet Control Function) (containing the IP address of the serving PCF), the BSID (Base Station Identification) (containing the Station ID, the Network ID, and the cell identifier), and the IPv6 (Internet Protocol version 6) PDSN Address (containing the IPv6 address of the PDSN).

Figure 4:
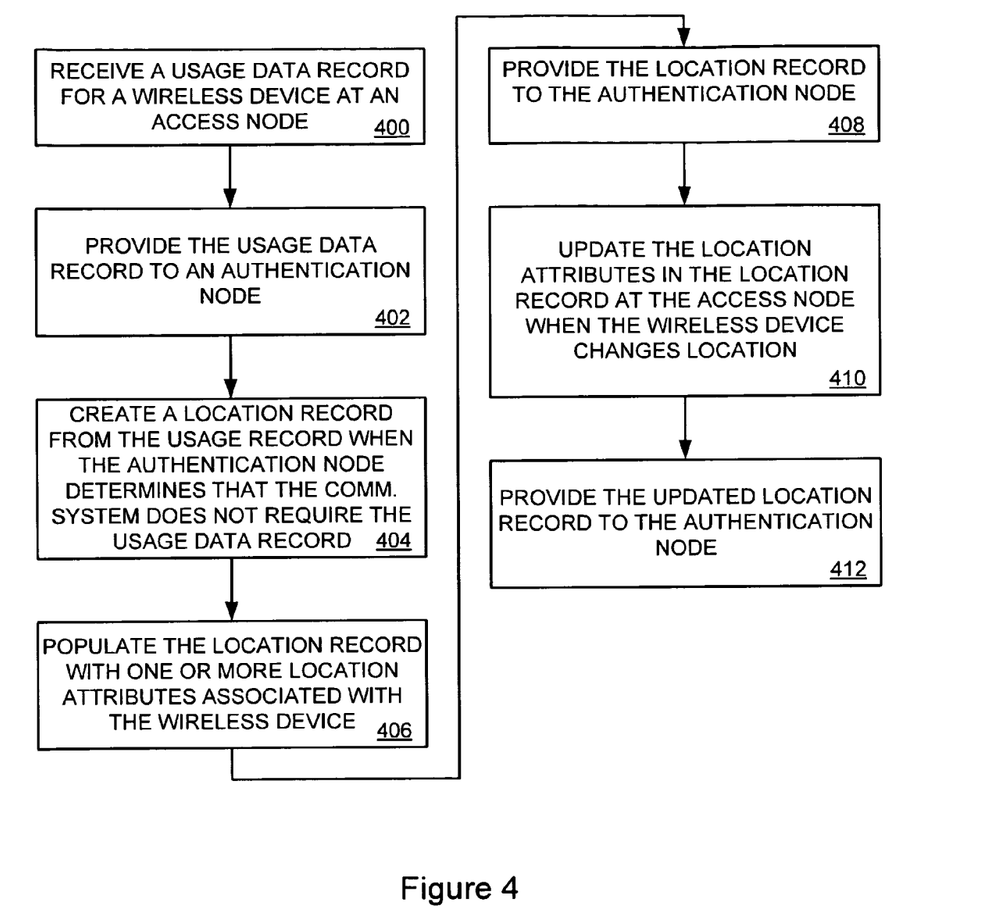
FIG. 4 is a flow diagram illustrating a method for providing location information for a wireless device in a communication system.

FIG. 4 is a flow diagram illustrating a method for providing location information for a wireless device in a communication system. Reference numerals for FIG. 4 are indicated parenthetically below. In an example embodiment, access gateway 306 receives a usage data record for wireless device 302, (operation 400). Access gateway 306 then provides the usage data record to an authentication node, such as AAA system 308, (operation 402). If AAA system 308 determines that communication system 300 does not require the usage data record, access gateway 306 or AAA system 308 creates a location record from the usage data record, (operation 404). Access gateway 306 or AAA system 308 then populates the location record with one or more location attributes associated with wireless device 302, (operation 406). The location record is provided to AAA system 308, (operation 408). When wireless device 302 changes location, access gateway 306 updates the location attributes in the location record, (operation 410), and provides the updated location record to AAA system 308. In other embodiments, AAA system 308 or other elements of communication system 300 may update the location attributes in the location record.

Figure 5:
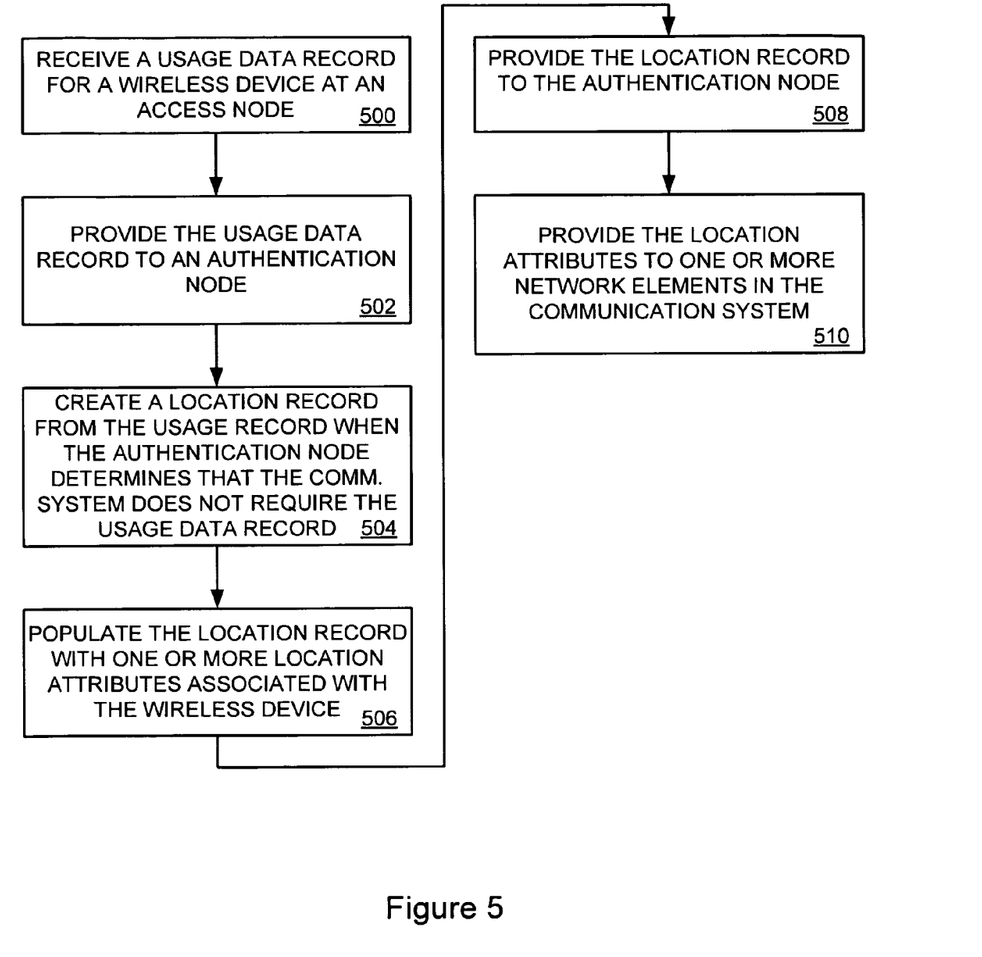
FIG. 5 is a flow diagram illustrating a method for providing location information for a wireless device in a communication system.

FIG. 5 is a flow diagram illustrating a method for providing location information for a wireless device in a communication system. Reference numerals for FIG. 5 are indicated parenthetically below. In an example embodiment, access gateway 306 receives a usage data record for wireless device 302, (operation 500). Access gateway 306 then provides the usage data record to an authentication node, such as AAA system 308, (operation 502). If AAA system 308 determines that communication system 300 does not require the usage data record, access gateway 306 or AAA system 308 creates a location record from the usage data record, (operation 504). Access gateway 306 or AAA system 308 populates the location record with one or more location attributes associated with wireless device 302, (operation 506). The location record is provided to AAA system 308, (operation 508). AAA system 308 then provides the location attributes to one or more network elements in communication system 300, such as LDAP system 310, PCRF system 312, and WAP gateway 314.

Figure 6:
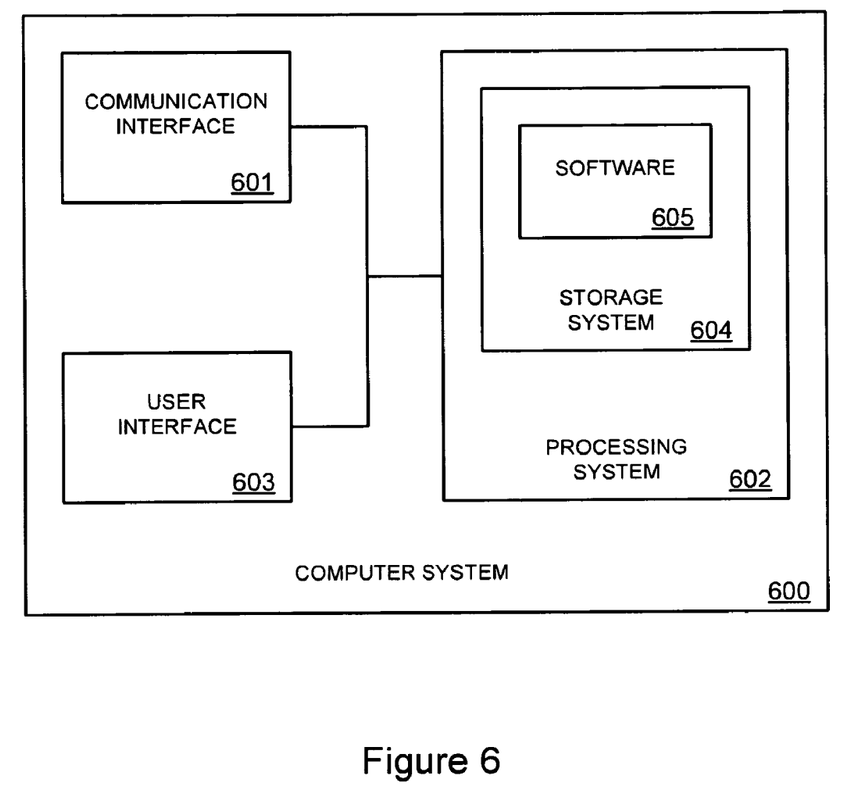
FIG. 6 is a block diagram illustrating a computer system configured to provide location information for a wireless device in a communication system.

FIG. 6 is a block diagram illustrating a computer system configured to provide location information for a wireless device in a communication system. Computer system 600 includes communication interface 601, processing system 602, and user interface 603. Processing system 602 includes storage system 604. Storage system 604 stores software 605. Processing system 602 is linked to communication interface 601 and user interface 603. Computer system 600 could be comprised of a programmed general-purpose computer, although those skilled in the art will appreciate that programmable or special purpose circuitry and equipment may be used. Computer system 600 may be distributed among multiple devices that together comprise elements 601-605.

Communication interface 601 could comprise a network interface, modem, port, transceiver, or some other communication device. Communication interface 601 may be distributed among multiple communication devices. Processing system 602 could comprise a computer microprocessor, logic circuit, or some other processing device. Processing system 602 may be distributed among multiple processing devices. User interface 603 could comprise a keyboard, mouse, voice recognition interface, microphone and speakers, graphical display, touch screen, or some other type of user device. User interface 603 may be distributed among multiple user devices. Storage system 604 could comprise a disk, tape, integrated circuit, server, or some other memory device. Storage system 604 may be distributed among multiple memory devices.

Processing system 602 retrieves and executes software 605 from storage system 604. Software 605 may comprise an operating system, utilities, drivers, networking software, and other software typically loaded onto a computer system. Software 605 could comprise an application program, firmware, or some other form of machine-readable processing instructions. When executed by processing system 602, software 605 directs processing system 602 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for providing location information for a wireless device in a communication system, the method comprising:
   receiving a usage data record for the wireless device at an access node;
   providing the usage data record to an authentication node;
   creating a location record from the usage data record when the authentication node determines that the communication system does not require the usage data record;
   populating the location record with one or more location attributes associated with the wireless device; and
   providing the location record to the authentication node.

2. The method of claim 1, wherein the authentication node is an authentication, authorization, and accounting (AAA) system.

3. The method of claim 1 further comprising:
   updating the location attributes in the location record at the access node when the wireless device changes location; and
   providing the updated record location to the authentication node.

4. The method of claim 1 further comprising:
   providing the location attributes to one or more network elements in the communication system.

5. The method of claim 1, wherein creating the location record comprises creating the location record in the access node.

6. The method of claim 1, wherein creating the location record comprises creating the location record in the authentication node.

7. The method of claim 1, wherein populating the location record comprises populating the location record in the access node.

8. The method of claim 1, wherein populating the location record comprises populating the location record in the authentication node.

9. A computer system configured to provide location information for a wireless device in a communication system, the computer system comprising:
   a storage system containing software;
   a communication interface configured to receive a usage data record for the wireless device; and
   a processing system coupled to the communication interface and the storage system;
   wherein the processing system is instructed by the software to:
      receive a usage data record for the wireless device at an access node through the communication interface;
      provide the usage data record to an authentication node;
      create a location record from the usage data record when the authentication node determines that the communication system does not require the usage data record;
      populate the location record with one or more location attributes associated with the wireless device; and
      provide the location record to the authentication node.

10. The computer system of claim 9, wherein the authentication node is an authentication, authorization, and accounting system.

11. The computer system of claim 9, wherein the processor is further instructed by the software to:
   update the location attributes in the location record at the access node when the wireless device changes location; and
   providing the updated record location to the authentication node.

12. The computer system of claim 9, wherein the processor is further instructed by the software to:
   provide the location attributes to one or more network elements in the communication system.

13. The computer system claim 9, wherein creating the location record comprises creating the location record in the access node.

14. The computer system claim 9, wherein creating the location record comprises creating the location record in the authentication node.

15. The computer system claim 9, wherein populating the location record comprises populating the location record in the access node.

16. The computer system of claim 9, wherein populating the location record comprises populating the location record in the authentication node.

17. A method for providing location information for a wireless device in a communication system, the method comprising:
- receiving a usage data record for the wireless device at an access node;
- providing the usage data record to an authentication node;
- creating a location record from the usage data record when the authentication node determines that the communication system does not require the usage data record;
- populating the location record with one or more location attributes associated with the wireless device;
- providing the location record to the authentication node;
- updating the location attributes in the location record at the access node when the wireless device changes location; and
- providing the updated record location to the authentication node.

18. The method of claim 17, wherein the authentication node is an authentication, authorization, and accounting (AAA) system.

19. The method of claim 17 further comprising:
- providing the location attributes to one or more network elements in the communication system.

20. The method of claim 19, wherein the one or more network elements includes a Lightweight Directory Access Protocol (LDAP) system.

21. The method of claim 19, wherein the one or more network elements includes a Wireless Application Protocol (WAP) gateway.

22. The method of claim 17, wherein creating the location record comprises creating the location record in the access node.

23. The method of claim 17, wherein creating the location record comprises creating the location record in the authentication node.

24. The method of claim 17, wherein populating the location record comprises populating the location record in the access node.

25. The method of claim 17, wherein populating the location record comprises populating the location record in the authentication node.

* * * * *